US008422087B2

(12) United States Patent
Ogino

(10) Patent No.: US 8,422,087 B2
(45) Date of Patent: Apr. 16, 2013

(54) IMAGE READING APPARATUS AND IMAGE READING METHOD

(75) Inventor: Koji Ogino, Minamikoma-gun (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 722 days.

(21) Appl. No.: 12/585,762

(22) Filed: Sep. 24, 2009

(65) Prior Publication Data
US 2010/0085615 A1 Apr. 8, 2010

(30) Foreign Application Priority Data

Oct. 3, 2008 (JP) ................................ 2008-258886

(51) Int. Cl.
H04N 1/04 (2006.01)
(52) U.S. Cl.
USPC ............ 358/474; 358/497; 358/486; 358/408
(58) Field of Classification Search .................. 358/474, 358/497, 486, 408, 488
See application file for complete search history.

(56) References Cited

U.S. PATENT DOCUMENTS

| 5,473,445 | A | * | 12/1995 | Takei et al. | 358/474 |
| 5,970,181 | A | * | 10/1999 | Ohtsu | 382/274 |
| 7,515,316 | B2 | * | 4/2009 | Osakabe | 358/474 |
| 2003/0128406 | A1 | * | 7/2003 | Higuchi | 358/474 |

FOREIGN PATENT DOCUMENTS

| JP | 08317110 | * | 11/1996 |
| JP | 2000-349962 | | 12/2000 |
| JP | 2003-244395 | | 8/2003 |
| JP | 2004-032570 | | 1/2004 |
| JP | 2008-160582 | | 7/2008 |

* cited by examiner

Primary Examiner — Houshang Safaipour
(74) Attorney, Agent, or Firm — Manabu Kanesaka

(57) ABSTRACT

An image reading apparatus is provided which enables image data of high S/N ratio with constant resolution to be acquired without fluctuations in resolution over the entire area of an original document, while actualizing the compact image reading apparatus by minimizing the spaces on the opposite end sides in the sub-scanning direction of the platen, has a line light source for applying light to the original document, a carriage installed with the line light source to travel in a sub-scanning direction of the document, a stepping motor for driving the carriage, a line sensor for receiving the reflected light of the document guided by the optical means to convert into image data, and control means for performing traveling control of the carriage, blinking control of the line light source, and control for capturing the image data from the line sensor, and captures the image data from the line sensor while varying a period of a motor clock signal to drive the stepping motor for a duration of acceleration control for starting traveling of the carriage to reach constant-velocity traveling after starting reading of the document.

9 Claims, 8 Drawing Sheets

IMAGE READING APPARATUS AND IMAGE READING METHOD

BACKGROUND OF THE INVENTION

Technical Field

The present invention relates to an image reading apparatus installed in a copier and facsimile machine to apply light to an original document, receive the reflected light and obtain image data of the document and a method of the apparatus, and more particularly, to an image reading apparatus of the carriage traveling type and image reading method.

As general schemes for reading original documents, there are two schemes. One of the schemes is an image reading scheme provided with an auto document feeder (ADF) to apply light to an original document, which is read in a fixed position and transported, while transporting the document at a constant velocity to read, and obtain the reflected light, for example, as disclosed in Japanese Laid-Open Patent Publication No. 2004-32570. The other one is an image reading scheme of the carriage traveling type for applying light to an original document mounted on a document mount (platen) made of transparent glass to read the reflected light.

FIG. 8 is a schematic view to explain the operation of such an image reading apparatus 100 of the carriage traveling type. As shown in FIG. 8, an original document (not shown) is mounted on a platen 2 attached onto a chassis 1, and a first carriage 3 and second carriage 7 cooperate to project an image on the document to a photoelectric converter (referred to as a "line sensor" in the invention) 12 such as a CCD or the like.

The mounted document is irradiated by a light source 4 disposed in the first carriage 3, and diffused light of the applied light is passed through an opening 5 of the first carriage 3 and changed in optical path in the sub-scanning direction by a first mirror 6. The image on the document of which the optical path is changed is guided downward by a second mirror 8 of the second carriage 7, and then to a lens 11 by a third mirror 9. Then, image data condensed by the lens 11 is applied to the line sensor 12 of a CCD substrate 13 secured to the chassis 1 at an angle 14.

An image signal that is an electric signal converted in the line sensor 12 is processed by the CCD substrate 13 and an image processing circuit on a control substrate (not shown) disposed inside a housing of the image reading apparatus. In order that the length of the optical path from the document surface to lens 11 via a plurality of mirrors 6, 8, 9 is always kept constant, the first carriage 3 is configured to perform sub-scanning at a speed twice the speed of the second carriage 7.

Further, as well as the image reading apparatus 100 of the two-carriage traveling type as shown in FIG. 8, an image reading apparatus of the one-carriage traveling type has been put to practical use, where the first carriage 3, second carriage 7 and CCD substrate 13 are integrally formed.

Herein, to drive the carriages 3, 7 traveling with the light source 4 and the like mounted thereon, stepping motors are capable of controlling the traveling distance accurately on a predetermined unit distance basis, and are generally used. The image data is captured from the line sensor 12 corresponding to a shift distance of the carriage on a number-of-step basis by the stepping motor, and the resolution of document image reading is thereby made uniform.

However, in starting image reading, since it is necessary to accelerate the halted carriages 3, 7 to constant velocities, the so-called through-up control is known where the step period is increased at startup, and is gradually decreased for the duration of acceleration. Then, in such through-up control, proposed are techniques for synchronizing an image sensor and stepping motor to drive even when frequencies are different between the clock to control the driving period of the image sensor (line sensor) and the reference clock (motor clock signal) to control the step period of the stepping motor (for example, see JP 2000-349962).

Meanwhile, when an original document is read by a CCD line sensor, in order to read the document at an S/N ratio as high as possible while adjusting fluctuations in brightness of the line sensor, and ensure a wide photoelectric conversion range of the CCD line sensor, it is proposed to combine inverter modulated light for varying the voltage applied to the light source and PWM modulated light for adjusting the voltage application time to the light source (for example, see JP 2003-244395).

Herein, as described in JP 2003-244395, as a light source for applying light to an original document, cold-cathode tubes have conventionally been used widely. In recent years, since LEDs have been developed which are high in emission efficiency and emit light with a good balance in the light region of three primary colors, a line light source of a combination of a plurality of LEDs has been used (for example, see JP 2008-160582).

However, as described above, in the image reading apparatus, it is required to acquire the image data of uniform resolution over the entire surface of an original document targeted for reading. Therefore, an image reading pitch in the sub-scanning direction is required to be uniform all over the document area from the edge portions to the center portion, and in starting reading the document, it is necessary to acquire the image data when the carriages 3, 7 are made constant velocities after starting the carriages 3, 7. Therefore, as shown in FIG. 8, the conventional image reading apparatus needs spaces A, B to withdraw the carriages 3, 7 with certain widths, and to accelerate traveling velocities of the carriages 3, 7 to stable velocities after startup in starting reading the document. In other words, it is compelled to set the home position of the carriage 3 in a position embedded under the space A from below the platen 2, and it is thus made difficult reducing the apparatus size.

Further, in the image reading apparatus as described in Patent Document 1, reading of the CCD line sensor is performed in resolution of one-step transportation, and since the reading period of the CCD line sensor is always kept constant, the timing for reading the image data from the line sensor is uncertain in a single step of the stepping motor for driving the carriage. Further, at the time of constant-velocity driving, since the counting means is reset by driving the image sensor after counting the driving period of the stepping motor, the driving period of the driving period has an upper limit half the driving period of the image sensor, and it is not possible to read the image data at a high velocity. This is because the line light source is always lit, the exposure time needs to be constant, the reading period is thus not varied, and therefore, it is not possible to synchronize traveling control of the carriage and reading control of image data from the CCD line sensor unless exposure (lighting of the line light source) and reading from the CCD line sensor is executed as a set for the duration of one step of a motor clock signal of the stepping motor.

The present invention was made in view of the problems of the above-mentioned conventional technique, and it is an object of the invention to provide an image reading apparatus and image reading method enabling image data of high S/N ratio with constant resolution to be acquired without fluctuations in resolution over the entire area of an original document, while making the image reading apparatus small and compact by minimizing the spaces (A and B in FIG. 8) on the opposite end sides in the sub-scanning direction of the platen.

BRIEF SUMMARY OF THE INVENTION

To attain the above-mentioned object, the present invention provides an image reading apparatus of the carriage traveling type which applies light to an original document mounted on a platen to read reflected light of the light, and which has a line light source for applying light to the original document, a carriage installed with the line light source and optical means for changing an optical path of the reflected light to travel in a sub-scanning direction of the document, a stepping motor for driving the carriage, a line sensor for receiving the reflected light of the document guided by the optical means to convert into image data, and control means for performing traveling control of the carriage, blinking control of the line light source, and control for capturing the image data from the line sensor, where the control means captures the image data from the line sensor while varying a period of a motor clock signal to drive the stepping motor for a duration of acceleration control for starting traveling of the carriage to reach constant-velocity traveling after starting reading of the document.

Herein, for the duration of acceleration control of the carriage, the control means captures the image data, while gradually decreasing the period of the motor clock signal to drive the stepping motor to a constant-velocity traveling period of the carriage from a beforehand set longest period.

Then, the control means captures the image data from the line sensor also for the duration of deceleration control for decelerating the carriage to halt after the constant-velocity traveling of the carriage. Therefore, for the duration of deceleration control of the carriage, the control means varies the period of the motor clock signal to drive the stepping motor, and captures the image data while gradually increasing the period of the motor clock signal to drive the stepping motor to the longest period from the constant-velocity traveling period.

Herein, a basic reading period of the line sensor is set while being synchronized with the motor clock signal, the line light source is formed of one or more LEDs, and the control means lights the line light source for a predetermine time after outputting the motor clock signal, and captures the image data of the line sensor for a period of the time.

The present invention further provides an image reading method of the carriage traveling type for receiving reflected light of light applied to an original document surface from a line light source mounted on a carriage traveling in a subscanning direction of original document reading to obtain image data, where the method has the steps of (A) driving the carriage using a motor clock signal with a beforehand set longest period in starting reading of the document, (b) lighting the line light source for a predetermined time at timing synchronized with the motor clock signal, (c) capturing image data stored during the step (b) from the line sensor for a reading period subsequent to the reading period in the step (b) of the line light source, (d) driving the stepping motor using a motor clock signal with a period shorter than that of the motor clock signal of the step (a) by a predetermined time, (e) executing the steps (b) and (c), (f) repeating the steps (d) and (e) until the period of the motor clock signal becomes a period in constant-velocity traveling of the carriage, and (g) driving the stepping motor using the motor clock signal with the period of constant-velocity traveling, and after lighting the line light source for a predetermined time at timing synchronized with the motor clock signal, capturing image stored during a lighted reading period from the line sensor for a reading period subsequent to the lighted reading period during which the line light source is lit.

The method further has the steps of (h) driving the stepping motor using a motor clock signal with a longer period than that of the motor clock signal of the constant-velocity traveling by the predetermined time, (i) executing the steps (b) and (c), and (j) repeating the steps (d) and (e) until a period of the motor clock signal becomes the longest period.

Further, the reading period of the line sensor is set while being synchronized with the motor clock signal.

By this means, the invention is to capture image data from the line sensor while varying the period of the motor clock signal to drive the stepping motor for a duration of acceleration control for starting traveling of the carriage to reach constant-velocity traveling and/or a duration from the constant-velocity traveling of the carriage to deceleration control after starting reading of an original document, and thereby actualizes miniaturization of the image reading apparatus.

Further, the basic reading period of the line sensor is set while being synchronized with the motor clock signal, the control means lights the line light source formed of LEDs for a predetermine time after outputting the motor clock signal, and captures the image data of the line sensor for a period of the time, and it is thereby possible to acquire image data of high S/N ratio with constant resolution without fluctuations in resolution over the entire area of an original document.

DETAILED DESCRIPTION OF THE INVENTION

Embodiments of an image reading apparatus and image reading method according to the invention will specifically be described below with reference to accompanying drawings.

Figure 1:
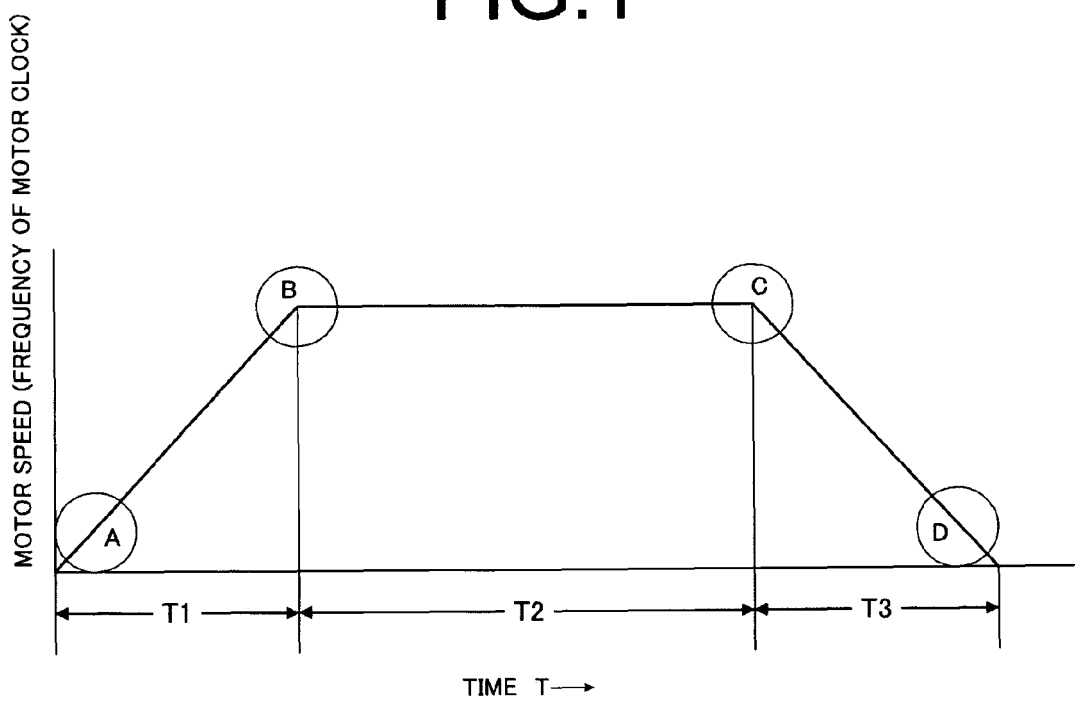
FIG. 1 is a view to explain features of image reading in the invention.
Figure 8:
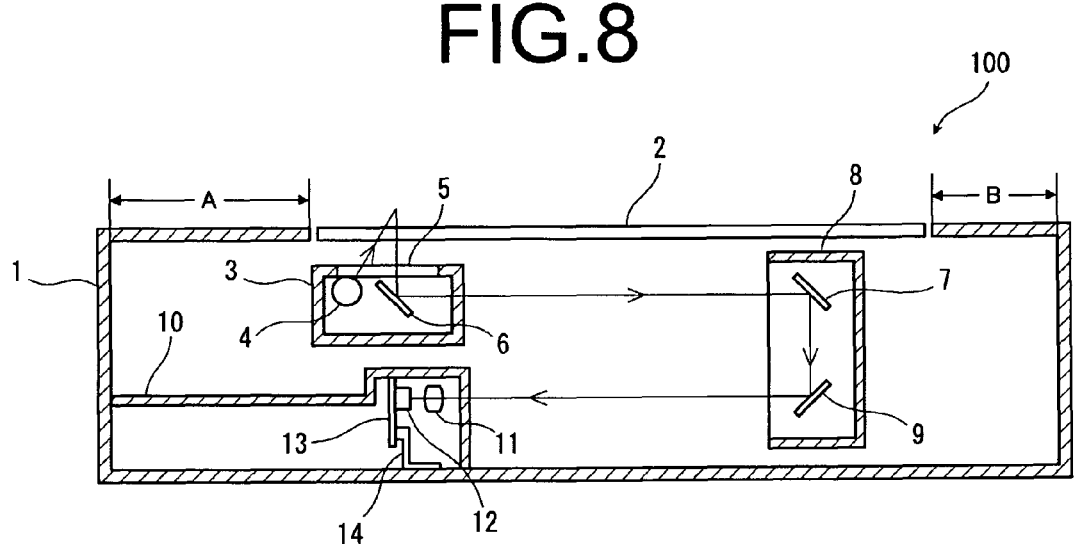
FIG. 8 is a schematic view to explain operation of an image reading apparatus 100 of the carriage traveling type.

FIG. 1 is to explain features of image reading in the invention, where after starting reading of an original document, not only for a constant-velocity time period (T2) of a carriage 3 (FIG. 8), but also for the duration of acceleration control from traveling startup of the carriage to constant-velocity traveling and of deceleration control containing from acceleration time period (T1) to deceleration time period (T3), the image data is captured from a line sensor while varying the period of a motor clock signal to drive a stepping motor. Meanwhile, in the conventional image reading apparatus, only for the constant-velocity time period (T2) of the carriage 3, image reading has been performed.

Figure 2:
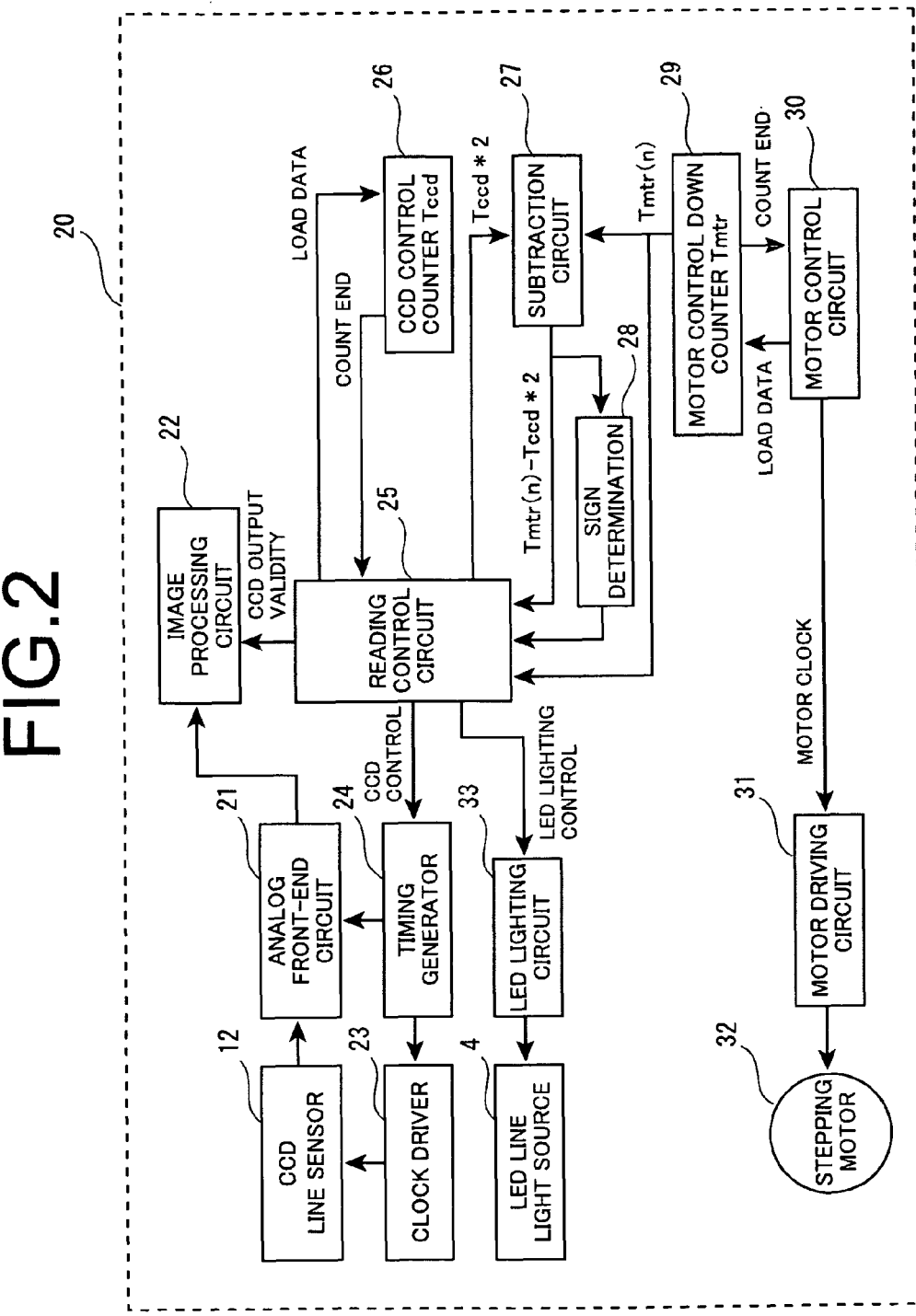
FIG. 2 shows an example of a configuration of a control apparatus 20 in an image reading apparatus of the invention.

FIG. 2 shows an example of a configuration of a control apparatus 20 in an image reading apparatus of the invention. The basic operation of the control apparatus 20 as shown in FIG. 2 will be described below.

In the image reading apparatus of the carriage traveling type, for an original document mounted on a platen 2 (FIG. 8), while shifting the carriage 3, the image data is read from a CCD line sensor 12 for each shift pitch corresponding to resolution (for example, 1200 dpi). Therefore, a stepping motor 32 is used as a power supply for driving traveling of the carriage. The rotation angle of the stepping motor 32 corresponds to a single motor clock signal output from a motor control circuit 30, and it is thus possible to accurately control a shift distance of the carriage 3. In FIG. 2, the motor clock signal is subjected to signal processing such as amplification and the like in a motor driving circuit 31, and supplied to the stepping motor 32.

The CCD line sensor 12 is comprised of, for example, a few thousand chips for performing photoelectric conversion arranged in one dimension. The arrangement direction is referred to as a main-scanning direction. Then, a direction perpendicular to the main-scanning direction is a sub-scanning direction, and is a shift direction of the carriage 3.

The CCD line sensor 12 outputs a stored image signal to an analog front-end circuit whenever a reading period clock output from a clock driver 23 is input. In a timing generator 24 are installed a crystal oscillation circuit for outputting a basic clock and a counter circuit, and the generator 24 generates a clock signal for a reading period corresponding to the resolution. The analog front-end circuit 21 has an A/D conversion circuit that converts an analog image signal output from the CCD line sensor 12 into a digital signal in response to a timing signal from the timing generator 24 to output to an image processing circuit 22.

The image processing circuit 22 performs various kinds of processing such as shading correction for correcting optical distortion, etc. of the image data output from the analog front-end circuit 21, gamma correction and lightness correction that is curve correction of image lightness and density, scaling processing for processing the resolution of the image, and the like. These kinds of digital processing are generally known methods, and descriptions thereof are omitted herein.

A reading control circuit 25 is comprised of one or more chips, provided with a CPU (Central Processing Unit), ROM for storing programs and stationary data, rewritable RAM, etc. and controls the entire image reading apparatus 100. An LED line light source 4 mounted on the carriage 3 is controlled to light by an LED light signal output from the reading control circuit 25 in response to a reading period of the CCD. An LED lighting circuit 33 is a driver circuit for driving the LED line light source by an LED light signal.

A CCD control counter 26 is a circuit to define a reading period of the CCD line sensor 12, receives a basic reading period Tccd output from the reading control circuit 25 or reading period T1 held in a motor control down counter when an EOL signal indicative of a final reading period in the nth step is active, and outputs a count finish signal to the reading control circuit 25 at the time the count value reaches a predetermined value.

The motor control circuit 30 has a circuit for generating a period Tmtr(n) of a motor clock corresponding to the reading resolution, and the time T is loaded into the motor control down counter 29 as an initial value of the nth step. The motor control down counter 29 holds the time T1 lapsed until the motor is moved next, and updates the value of T1 whenever the reading period of the CCD is finished. A subtraction circuit 27 calculates "T1−2·Tccd" from T1 obtained from the motor control down counter 29 and the above-mentioned basic reading period Tccd of the CCD line sensor 12 to output to the reading control circuit 25, and the reading control circuit 25 obtains a motor clock signal of the stepping motor 32, a blinking signal of the LED line light source 4, EOL signal indicative of a final reading period in the nth step, and capture timing signal of the CCD line sensor from "T1−2·Tccd" and sign determination 28 of the calculation result.

Figure 3:
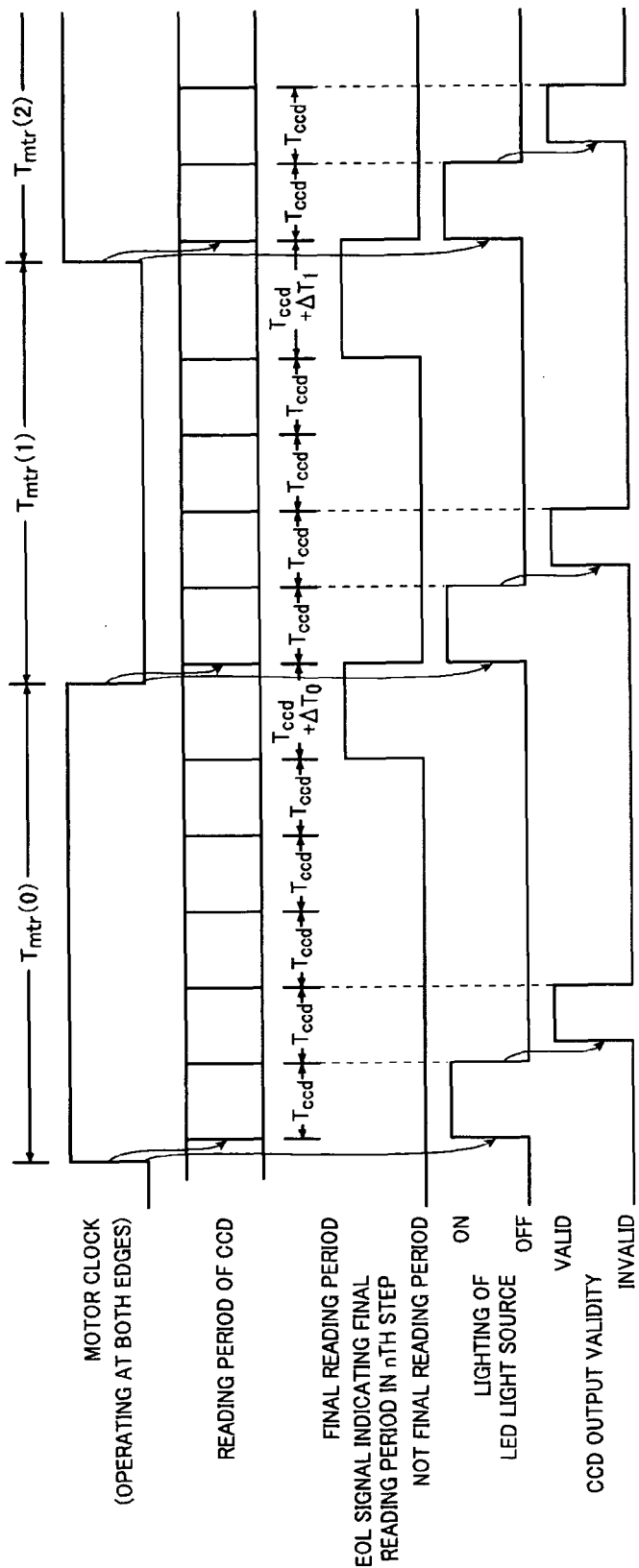
FIG. 3 shows an example of a timing chart of image reading according to the invention in an initial stage A of acceleration control of a carriage as shown in FIG. 1.

FIG. 3 shows an example of a timing chart of image reading according to the invention in an initial stage A of acceleration control of the carriage as shown in FIG. 1.

Figure 4:
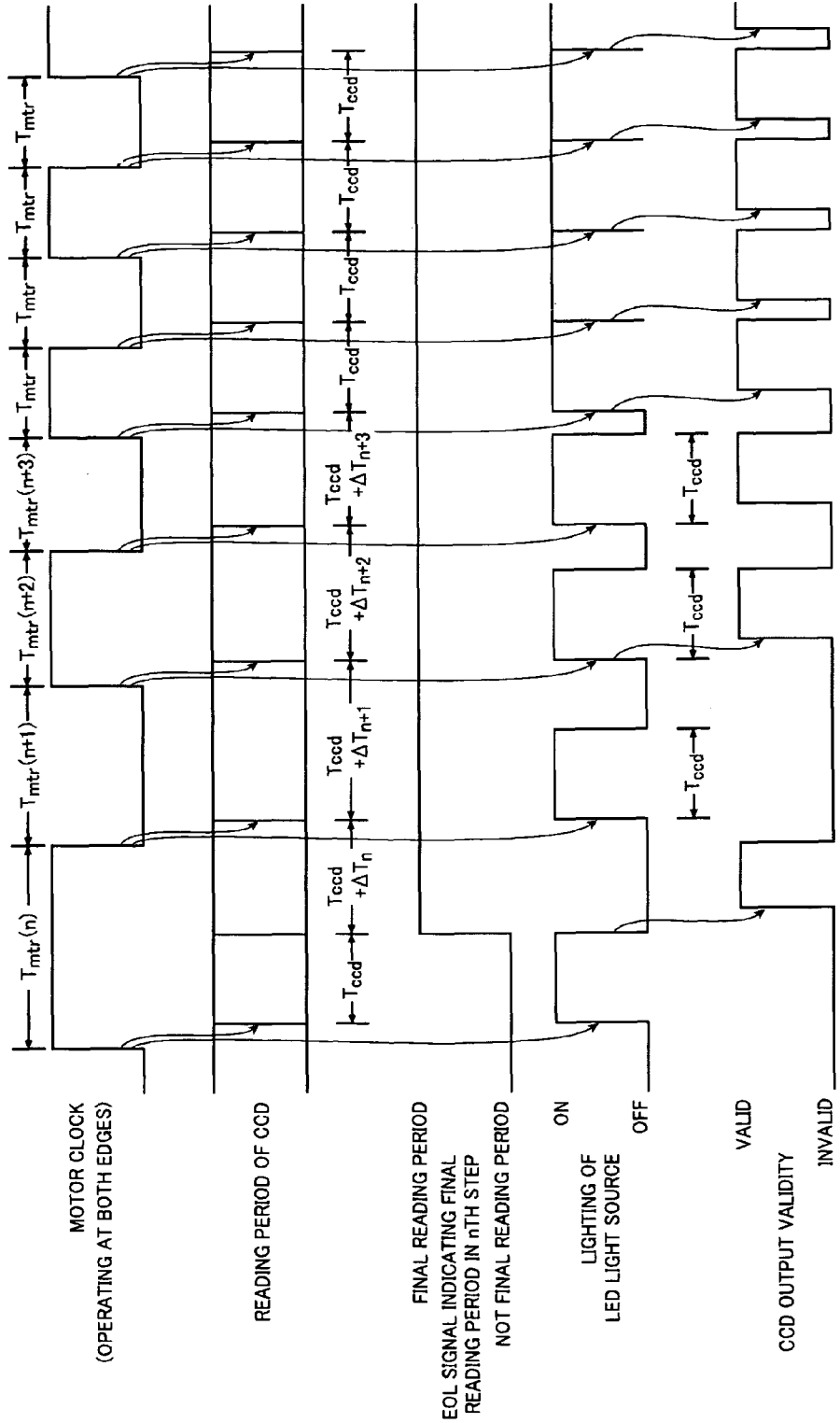
FIG. 4 shows an example of a timing chart of image reading according to the invention in a final stage B of acceleration control of the carriage as shown in FIG. 1.

FIG. 4 shows an example of a timing chart of image reading according to the invention in a final stage B of acceleration control of the carriage as shown in FIG. 1.

Figure 5:
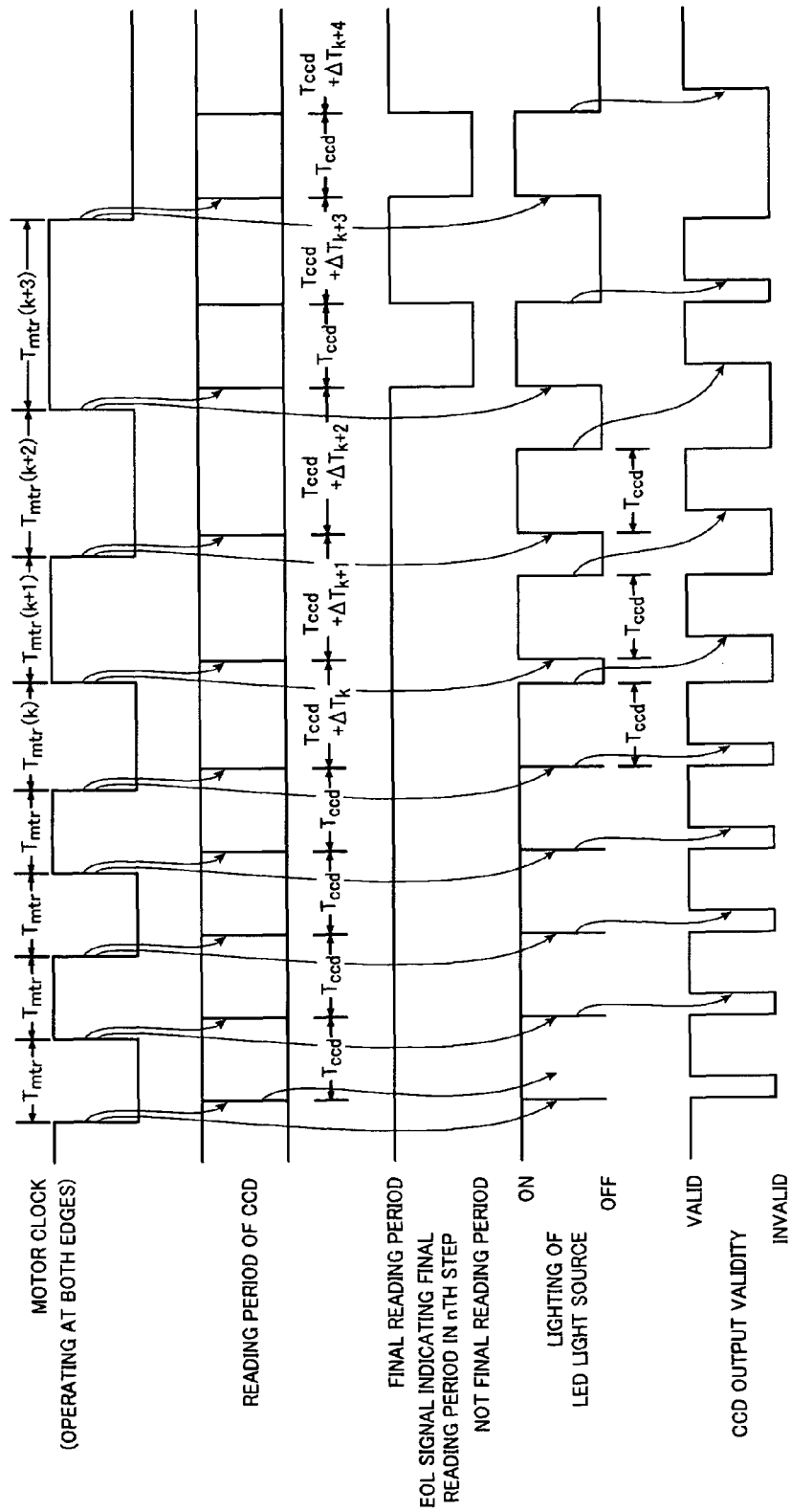
FIG. 5 shows an example of a timing chart of image reading according to the invention in an initial stage C of deceleration control of the carriage as shown in FIG. 1.

FIG. 5 shows an example of a timing chart of image reading according to the invention in an initial stage C of deceleration control of the carriage as shown in FIG. 1.

Figure 6:
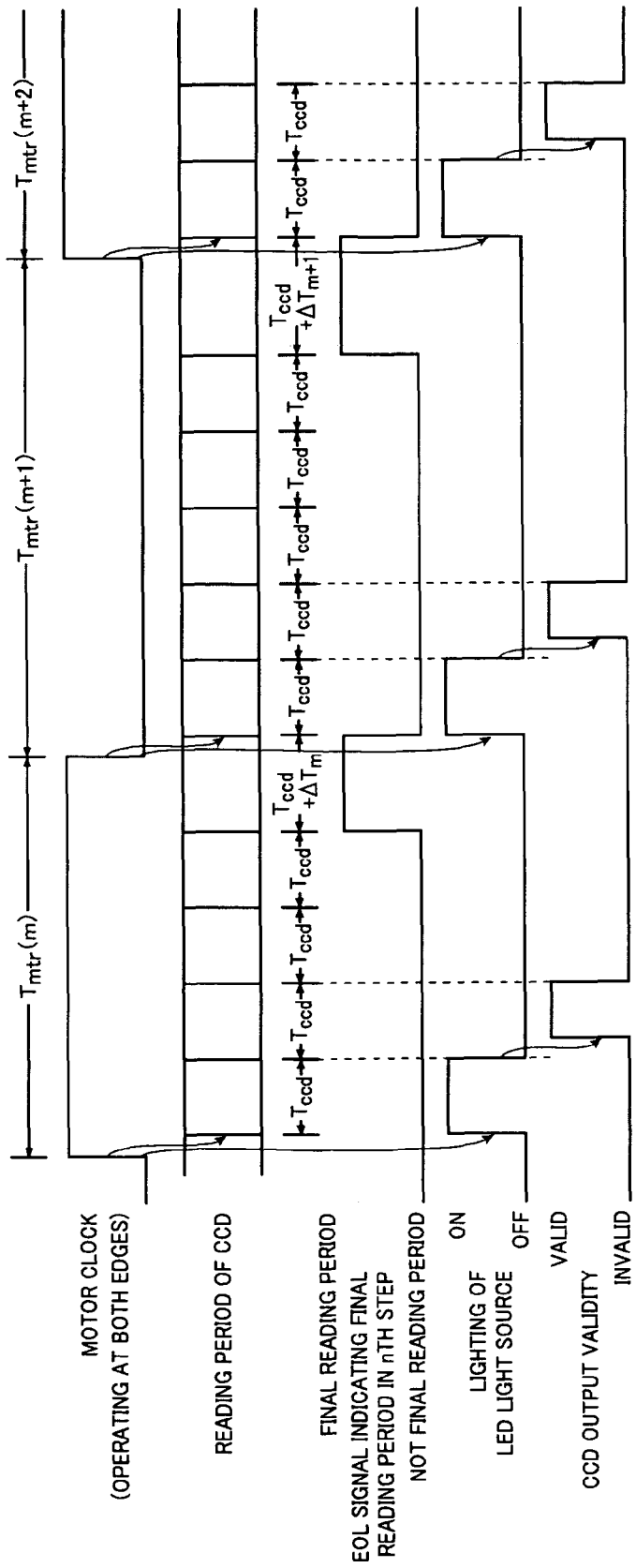
FIG. 6 shows an example of a timing chart of image reading according to the invention in a final stage D of deceleration control of the carriage as shown in FIG. 1.

FIG. 6 shows an example of a timing chart of image reading according to the invention in a final stage D of deceleration control of the carriage as shown in FIG. 1.

The timing charts as shown in FIGS. 3 to 6 will be described below.

A. Definition of Each Variable

Described first is definition of each variable described in each of the timing charts.

(1) Tmtr: which represents a period of a motor clock for the highest velocity when the stepping motor is subjected to acceleration/deceleration control;

(2) Tccd: which represents a basic reading period of CCD and is a fixed value;

(3) Tmtr(n): which represents a period of transport of the nth step and corresponds to a pulse width of the nth motor clock; and (4) T1: which is a time elapsed until the motor is next moved during a transport period of the nth step, and is a count value of the motor control down counter. The initial value is Tmtr(n), and updated at timing at which the CCD reading period is finished.

B. Setting of the Reading Period

First, the reading period (tens of kilohertz) of the CCD is set, synchronizing with a motor clock (tens to hundreds of kilohertz). Then, Tmtr(0) is decreased by Tccd in a cycle of Tccd, and the value is held as T1. In other words, the initial value of T1 is Tmtr(n), and is updated with a value of T1=T1−Tccd for each reading period of the CCD.

The reading period immediately before shifting to the step of n=1 from the step of n=0 i.e. the reading period of the CCD immediately before next moving the motor is varied in the range of Tccd to 2·Tccd, and is synchronized with the transport period. Specific descriptions are as follows:

(1) At the time of T1≧2·Tccd

The next CCD reading period is Tccd. Further, the time elapsed until the motor is next moved is calculated with the following equation, and the value is held at the motor control down counter.

$$T1 = T1 - Tccd$$

(2) At the Time of T1<2·Tccd

The next CCD reading period is T1. T1 is a value in the range of Tccd to 2·Tccd, and a value exceeding Tccd is an adjustment value for synchronizing the reading period and transport period.

In this procedure, the adjustment time to acquire synchronization is provided for a period during which the illumination light is turned off, and by setting an upper limit of the adjustment value at less than Tccd, it is possible to obtain the effect of preventing the CCD from storing excessive dark current.

C. Control of Lighting and Effective Image Signal

Lighting is performed for a predetermined time in reading immediately after the motor clock changes, and image data of the next period is made effective.

D. Explanation of the Operation (1) First, whenever the motor is operated by one step, data to count the transport period is loaded into the motor control down counter T1 to start counting. At the same time, counting of the CCD control counter is started to count the number of pixels of one line of the CCD. At this point, the LED light source is lit only for a predetermined time (time of Tccd in the timing chart).

(2) Whenever the CCD control counter finishes counting of Tccd, subsequent operation 3 and operation 4 are performed.

(3) The image data of the reading period subsequent to lighting of the LED light source is made effective.

(4) The processing is varied depending on whether or not the current reading period is a final reading period in a position of the nth step.

(i) Case that the Current Reading Period is not a Final Reading Period in a Position of the nth Step Referring to an EOL signal, when the current reading period is not a final reading period in a position of the nth step, the motor control down counter is updated as described below. A value twice Tccd is subtracted from T1, and when T1−2·Tccd is zero or more, T1 is updated with T1−Tccd, while when T1−2·Tccd is negative, the value of T1 is continuously held. Using a value of determination condition of T1−2·Tccd at this point, the subsequent CCD reading period is determined. In other words, when T1−2·Tccd is zero or more, the subsequent CCD reading period is set at Tccd, and since the subsequent reading period is not a final reading period in a position of the n+1th step, the EOL signal is made non-active.

Meanwhile, when T1−2·Tccd is negative, the subsequent CCD reading period is set at T1. When T1−2·Tccd is negative, the subsequent reading period is the final reading period in a position of the n+1th step, and the EOL signal is made active.

(ii) Case that the Current Reading Period is the Final Reading Period in a Position of the nth Step When the EOL signal is active, the current reading period is determined to be the final reading period in a position of the nth step. A subsequent motor clock transport period Tmtr(n+1) is loaded into the motor control down counter T1 to update T1. Further, the value twice Tccd is subtracted from T1 i.e. Tmtr (n+1), and the subsequent CCD reading period is set at T1 when the subtracted value is negative, while being set at Tccd when the subtracted value is positive.

When T1−2·Tccd is negative, the subsequent reading period is the final reading period in a position of the n+1th step, and the EOL signal indicating that the subsequent reading period is the final reading period in a position of the n+1th step is made active.

When T1−2·Tccd is zero or more, since the subsequent reading period is not the final reading period in a position of the n+1th step, the EOL signal indicating that the subsequent reading period is the final reading period in a position of the n+1th step is made non-active.

(5) Whenever the CCD control counter finishes counting of Tccd in the final reading period in the position of the nth step, the motor control clock is toggled to return to operation 1.

In addition, in the timing chart as shown in FIG. 4, the final CCD period in the nth step is shown by Tccd+ΔTn, and ΔTn corresponds to an adjustment amount to extend the reading period with respect to the basic reading period Tccd that is a constant value so as to synchronize transport and reading.

Figure 7:
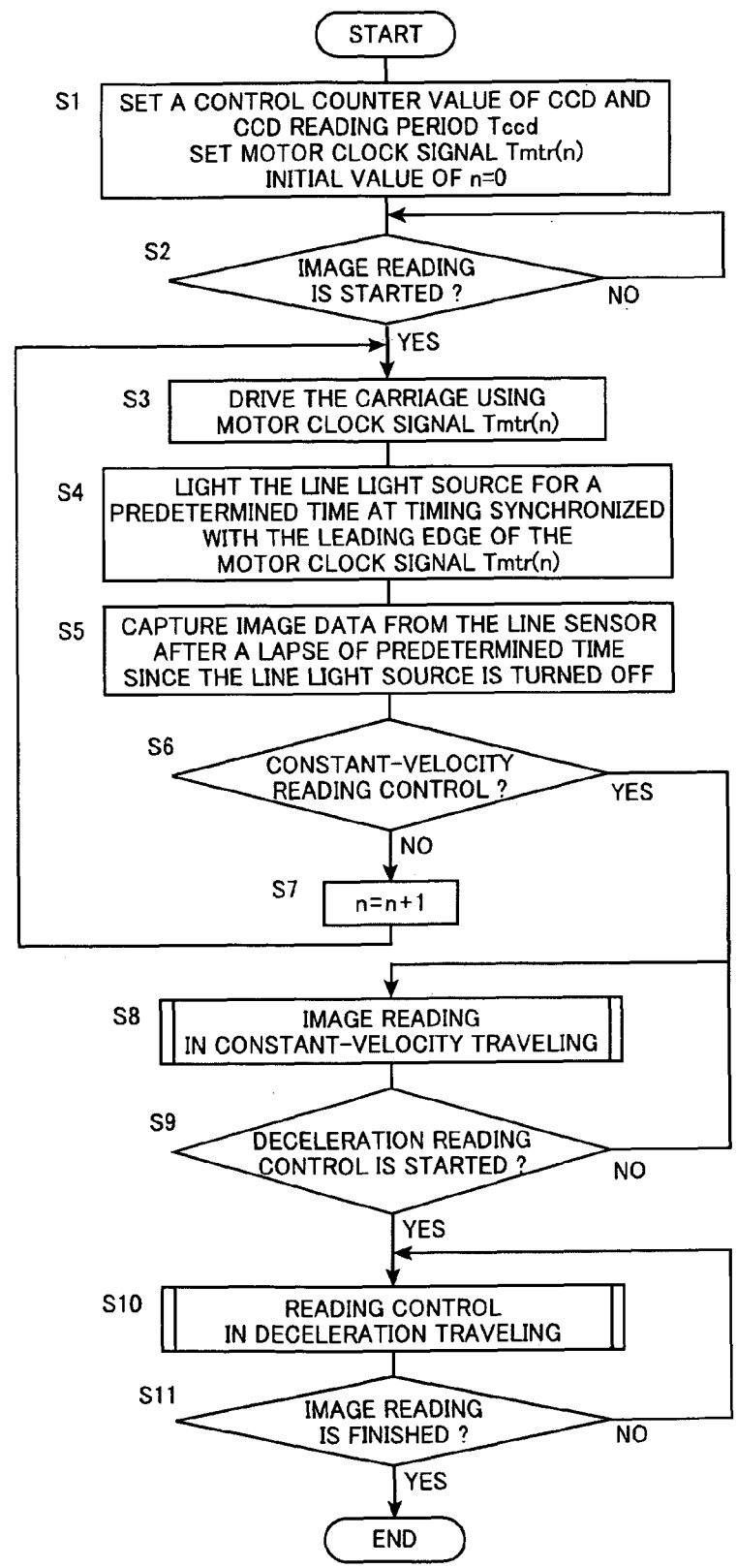
FIG. 7 is a flowchart to explain an image reading method according to the invention.

FIG. 7 is a flowchart to explain the image reading method according to the invention. In FIG. 7, when the image reading apparatus is turned on and the reading-targeted document size and reading resolution are determined, corresponding thereto, in the control circuit 20 (FIG. 2), a control counter value of the CCD line sensor 12 and CCD reading period Tccd are set, while the motor clock signal Tmtr(n) is set, and "0" is given as an initial value of n (S1).

Herein, when a reading start button is pressed in the image reading apparatus (S2), the stepping motor 32 receives a motor clock signal defined based on the motor clock signal Tmtr(0) via the motor driving circuit 31, and starts the carriage (S3). As shown in FIG. 3, the first motor clock signal Tmtr (0) is a motor clock with the longest period corresponding to moment of inertia of the carriage. Then, at timing (after a lapse of a predetermined time since the leading edge) synchronized with the leading edge of the motor clock signal Tmtr(0), the line light source 4 is lit only for a predetermined time (S4), and the image data is captured after turning off the line light source 4 (S5).

Next, for the duration of carriage acceleration control, "n" is incremented (S7), and until n becomes a predetermined value (S6), repeated are driving the carriage with the motor clock signal Tmtr(n), lighting the line light source 4 only for a predetermined time at timing synchronized with the leading edge of Tmtr(n) (S4), and capturing the image data after turning off the line light source 4 (S5). In the final stage of acceleration control, as shown in FIG. 4, the period of motor clock signal Tmtr(n) converges to the shortest period in constant-velocity reading. At this point, the LED line light source 4 is continuously lit, and capturing of image data from the CCD line sensor 12 is performed whenever the reading period Tccd of CCD rises.

Thus, after the acceleration control of the carriage is finished, image reading in constant-velocity traveling is performed (S8).

Then, after image reading in constant-velocity traveling (S9), reading control in deceleration traveling is performed (S10). The image reading control in deceleration traveling is similar to the reading control in the acceleration control as described above, and is performed so as to increase the period of motor clock signal Tmtr (n) gradually from the shortest period in constant-velocity reading to the longest period of motor clock signal Tmtr (0) (S10).

Thus, in the present invention, for the duration of acceleration control reaching constant-velocity traveling from traveling startup of the carriage and/or the duration of deceleration control from the constant-velocity traveling of the carriage after starting reading of an original document, the image data is captured from the line sensor while varying the period of the motor clock signal to drive the stepping motor, and miniaturization of the image reading apparatus is thereby actualized.

INDUSTRIAL APPLICABILITY

The present invention relates to an image reading apparatus installed in a copier and facsimile machine to apply light to an original document, receive the reflected light and obtain image data of the document, and a method of the apparatus, and has industrial applicability.

In addition, this application claims priority from Japanese Patent Application No. 2008-258886 incorporated herein by reference.

What is claimed is:

1. An image reading method of a carriage traveling type for receiving reflected light of light applied to an original document surface from a line light source mounted on a carriage traveling in a sub-scanning direction of original document reading to obtain image data, comprising the steps of:
   (a) driving the carriage using a motor clock signal with a beforehand set longest period in starting reading the document;
   (b) lighting the line light source for a predetermined time at timing synchronized with the motor clock signal;
   (c) capturing image data stored during the step (b) from the line sensor for a reading period subsequent to the reading period in the step (b) of the line light source;
   (d) driving the stepping motor using a motor clock signal with a period shorter than that of the motor clock signal of the step (a) by a predetermined time;
   (e) executing the steps (b) and (c);
   (f) repeating the steps (d) and (e) until the period of the motor clock signal becomes a period in constant-velocity traveling of the carriage; and
   (g) driving the stepping motor using the motor clock signal with the period of constant-velocity traveling, and after lighting the line light source for a predetermined time at timing synchronized with the motor clock signal, capturing image stored during a lighted reading period from the line sensor for a reading period subsequent to the lighted reading period during which the line light source is lit.

2. The image reading method according to claim 1, further comprising the steps of:
   (h) driving the stepping motor using a motor clock signal with a longer period than that of the motor clock signal of the constant-velocity traveling by the predetermined time;
   (i) executing the steps (b) and (c); and
   (j) repeating the steps (d) and (e) until a period of the motor clock signal becomes the longest period.

3. The image reading method according to claim 1, wherein the reading period of the line sensor is set while being synchronized with the motor clock signal.

4. An image reading apparatus, comprising:
   a platen on which a document is placed;
   a line light source applying light to the document placed on the platen;
   a line sensor receiving a reflected light from the light applied to the document by the line light source and converting the reflected light into image data;
   a carriage having the line light source and the line sensor and reading the document on the platen while traveling along a surface of the platen;
   a stepping motor driving the carriage;
   a motor control circuit generating a motor clock signal which drives the stepping motor; and
   a reading control circuit generating a reading period which drives the line sensor,
   wherein the reading control circuit varies the reading period so as to synchronize with the motor clock signal which is generated when accelerating a traveling speed of the carriage by the stepping motor, and
   the reading control circuit varies the reading period at a leading edge and a falling edge of the motor clock signal.

5. The image reading apparatus according to claim 4, wherein the reading control circuit
   subtracts a predetermined reading period from a time from the leading edge to the falling edge of the motor clock signal or a time from the falling edge to the leading edge of the motor clock signal to obtain a subtract result,
   repeatedly obtains the subtract result per the predetermined reading period, and
   varies the reading period to another reading period which is different from the predetermined reading period when the subtract result is less than twice the predetermined reading period.

6. An image reading apparatus, comprising:
   a platen on which a document is placed;
   a line light source applying light to the document placed on the platen;
   a line sensor receiving a reflected light from the light applied to the document by the line light source and converting the reflected light into image data;
   a carriage having the line light source and the line sensor and reading the document on the platen while traveling along a surface of the platen;
   a stepping motor driving the carriage;
   a motor control circuit generating a motor clock signal which drives the stepping motor;
   a reading control circuit generating a reading period which drives the line sensor; and
   a CCD control counter defining the reading period of the line sensor,
   wherein the reading control circuit varies the reading period so as to synchronize with the motor clock signal, and
   the motor control circuit has a circuit generating a period ($T_{mtr(n)}$) of a motor clock corresponding to a reading resolution.

7. The image reading apparatus according to claim 6, further comprising a motor control down counter,
   wherein a time T is loaded into the motor control down counter as an initial value of an n-th step.

8. The image reading apparatus according to claim 7, wherein the motor control down counter holds a time T1 lapsed until the stepping motor moves next time, and updates a value of T1 whenever the reading period of the line sensor is finished.

9. The image reading apparatus according to claim 8, further comprising a subtraction circuit calculating $T1-2 \cdot T_{ccd}$ from T1 obtained from the motor control down counter and a basic reading period $T_{ccd}$ of the line sensor to output to the reading control circuit,
   wherein the reading control circuit obtains the motor clock signal of the stepping motor, a blinking signal of the line light source, an EOL signal indicating a final reading period in the n-th step, and captures a timing signal of the line sensor from $T1-2 \cdot T_{ccd}$ and a sign determination of a calculation result.

* * * * *